(12) United States Patent
Herden et al.

(10) Patent No.: US 9,187,074 B2
(45) Date of Patent: Nov. 17, 2015

(54) METHOD FOR MONITORING A WHEEL OF A RAIL VEHICLE

(75) Inventors: Marc-Oliver Herden, Munich (DE); Rainer Rau, Geretsried (DE); Robert Haupt, Munich (DE); Marc-Gregory Elstorpff, Munich (DE)

(73) Assignee: KNORR-BREMSE SYSTEME FUR SCHIENENFAHRZEUGE GMBH, Munich (DE)

( * ) Notice: Subject to any disclaimer, the term of this patent is extended or adjusted under 35 U.S.C. 154(b) by 101 days.

(21) Appl. No.: 14/342,795

(22) PCT Filed: Sep. 7, 2012

(86) PCT No.: PCT/EP2012/067544
§ 371 (c)(1),
(2), (4) Date: Apr. 22, 2014

(87) PCT Pub. No.: WO2013/034713
PCT Pub. Date: Mar. 14, 2013

(65) Prior Publication Data
US 2014/0222284 A1    Aug. 7, 2014

(30) Foreign Application Priority Data
Sep. 9, 2011  (DE) .................. 10 2011 113 090

(51) Int. Cl.
*G01M 17/00* (2006.01)
*B60T 17/22* (2006.01)
*B61K 9/12* (2006.01)
*B60T 13/66* (2006.01)

(52) U.S. Cl.
CPC ............ *B60T 17/228* (2013.01); *B60T 13/665* (2013.01); *B61K 9/12* (2013.01)

(58) Field of Classification Search
USPC ......................................................... 701/34.4
See application file for complete search history.

(56) References Cited

U.S. PATENT DOCUMENTS

| | | | | |
|---|---|---|---|---|
| 5,649,749 | A | * | 7/1997 | Kullmann et al. ........ 303/122.04 |
| 5,743,495 | A | * | 4/1998 | Welles et al. ................ 246/121 |
| 2006/0163545 | A1 | * | 7/2006 | Newman ....................... 254/267 |
| 2006/0231355 | A1 | * | 10/2006 | Zhang ....................... 188/218 R |
| 2009/0271083 | A1 | * | 10/2009 | Kumar ............................ 701/70 |
| 2010/0248896 | A1 | * | 9/2010 | Dreier ........................... 477/118 |
| 2012/0306218 | A1 | * | 12/2012 | Bodnar et al. .............. 290/40 B |

FOREIGN PATENT DOCUMENTS

| | | |
|---|---|---|
| DE | 4242392 A1 | 6/1994 |
| EP | 1209052 A2 | 5/2002 |
| WO | 2008141775 A1 | 11/2008 |

OTHER PUBLICATIONS

International Preliminary Report on Patentability and Written Opinion of the International Search Authority for International Patent Application No. PCT/EP2012/067544, dated Sep. 7, 2012.

(Continued)

*Primary Examiner* — Hussein A. Elchanti
(74) *Attorney, Agent, or Firm* — Barnes & Thornburg LLP

(57) ABSTRACT

A method for monitoring a wheel mounted on a bogie of a rail vehicle. The method includes detecting a deformation of a brake for braking the wheel in a wheel circumferential direction of the wheel and checking the plausibility of the detected deformation based on a comparison with a target alignment.

10 Claims, 1 Drawing Sheet

(56) References Cited

OTHER PUBLICATIONS

English Translation of International Preliminary Report on Patentability and Written Opinion of the International Search Authority for International Patent Application No. PCT/EP2012/067544, dated Sep. 7, 2012.
Search Report for International Patent Application No. PCT/EP2012/067544; Aug. 20, 2013.

* cited by examiner

METHOD FOR MONITORING A WHEEL OF A RAIL VEHICLE

PRIORITY CLAIM

This patent application is a U.S. National Phase of International Patent Application No. PCT/EP2012/067544, filed 7 Sep. 2012, which claims priority to German Patent Application No. 10 2011 113 090.3, filed 9 Sep. 2011, the disclosures of which are incorporated herein by reference in their entirety.

FIELD

Disclosed embodiments relate to vehicles in general, and in particular to rail vehicles. Disclosed embodiments also relate to a method for monitoring a wheel mounted on a bogie of a rail vehicle and to a control device for carrying out the method.

BACKGROUND

DE 42 42 392 A1 discloses a rail vehicle.

The disclosed embodiments improve the known rail vehicle.

BRIEF DESCRIPTION OF THE FIGURES

Disclosed embodiments will be explained in more detail in conjunction with the drawings, in which.

DETAILED DESCRIPTION OF THE DISCLOSED EMBODIMENTS

Figure 1:
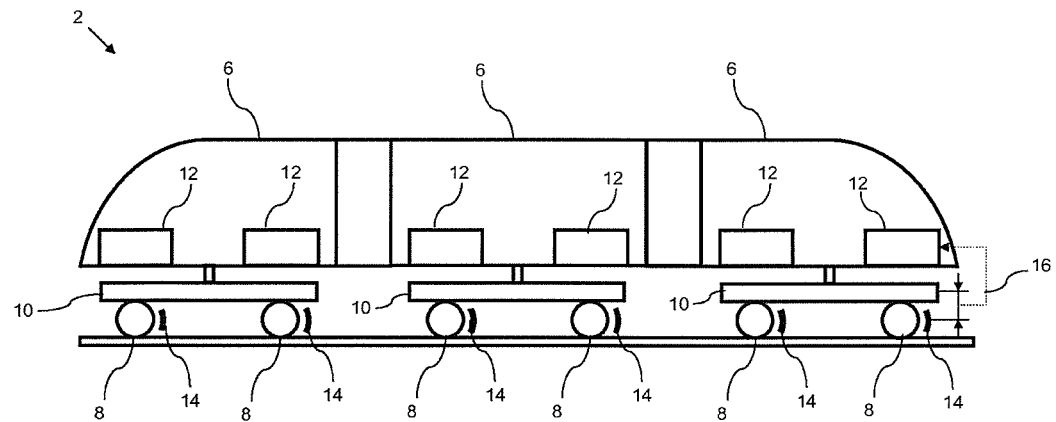
FIG. 1 shows a rail vehicle travelling on a rail.

According to at least one disclosed embodiment, a method for monitoring a wheel mounted on a bogie of a rail vehicle comprises the steps of detecting a deformation of a brake for braking the wheel in the circumferential direction of the wheel, and performing a plausibility check of the detected deformation on the basis of a comparison with a target position.

The stated method is based on the consideration that various items of information regarding the state of the wheel or the position thereof can be detected even from the loading of the brake on the rail vehicle. Since the rail is ideally planar, the brake should not deform during normal operation, or should deform only in an expected way, for example during a braking process. If the brake nevertheless deforms in an unexpected way, this can arise only as a result of vibrations imparted to the brake, which vibrations must be caused for example by faults on the wheel, such as out-of-roundness, or by faults on the route travelled by the rail vehicle, for example a derailment of the rail vehicle.

The deformation of the brake may be detected by means of any desired sensor which is suitable for detecting the deformation for example on the basis of a relative displacement of two points on the brake with respect to one another. A sensor of the type would be, for example, a strain gauge.

The plausibility check may be performed in any desired manner. It is the aim of the plausibility check to identify deviations of the deformation of the brake from an expected deformation of the brake, and to then derive fault states of the wheel and/or of the rail vehicle from the deviations.

The deformation of the brake may indeed be determined at any desired point in time. For example, if the brake is not actuated, then in principle any deformation of the brake could be caused by a vibration of the wheel because the rail vehicle is in theory travelling in a vibration-free manner over a planar rail. In one refinement, the specified method comprises the step of detecting the deformation of the brake during a braking process of the rail vehicle. The refinement is based on the consideration that the braking force acting on a wheel in the circumferential direction of the wheel, which braking force arises based on the applied actual braking force and the friction coefficient of the brake disk on which the actual braking force acts, can be determined from the detected deformation of the brake. By means of the specified method, the detected deformation of the brake could also be used not only for the detection of the active brake force in the circumferential direction of the wheel but also for state monitoring of the wheel.

In at least one disclosed embodiment, the detected deformation of the brake is dependent on a brake force acting on the wheel.

In a disclosed embodiment, the specified method comprises the step of filtering the detected deformation of the brake before the plausibility check of the detected relative position. The specified method is based on the consideration that the detected deformation of the brake could have a spectrum encompassing many different items of information. To make the plausibility check as reliable as possible, all known items of information should be filtered out from the spectrum such that, in the detected relative position, all that is ultimately left is a noise signal containing the information regarding the above-mentioned state of the wheel or the position thereof.

In a disclosed embodiment of the method, the filtering of the detected deformation of the brake comprises separating a deformation of the brake caused by the braking force, that is to say the expected deformation, from the detected deformation.

In another disclosed embodiment of the method, the specified method comprises the step of detecting a derailment of the rail vehicle if an excursion of the detected deformation of the brake exceeds a predetermined value.

In yet another disclosed embodiment, the specified method comprises the step of detecting an imbalance of the wheel if the detected deformation of the brake comprises a harmonic whose frequency corresponds to the rotation of the wheel or to a multiple of the rotation of the wheel.

With regard to the imbalance of the wheel, the detected deformation of the brake may be analyzed for an out-of-roundness and/or a flat spot.

According to another disclosed embodiment, a control device is set up to carry out one of the specified methods. Here, the control device may in particular be enhanced so as to be set up to carry out a method as claimed in one of the subclaims.

In a disclosed embodiment of the control device, the specified device has a memory and a processor. Here, the specified method is stored as a computer program in the memory and the processor is provided for carrying out the method when the computer program is loaded from the memory into the processor.

According to a further disclosed embodiment, a computer program comprises program code means for carrying out all of the steps of one of the specified methods when the computer program is executed on a computer or on one of the specified devices.

According to yet another disclosed embodiment, a computer program product comprises program code which is stored on a computer-readable data memory and which carries out one of the specified methods when executed on a data processing device.

According to another disclosed embodiment, a rail vehicle comprises a specified control device.

In the figures, identical technical elements are denoted by the same reference signs and are described only once.

Reference is made to FIG. 1, which shows a rail vehicle 2 on a rail 4.

In at least one disclosed embodiment, the rail vehicle 2 has three carriages 6 which are each borne on the rail 4 in rolling fashion by means of two wheels 8. The wheels 8 on each carriage 6 are connected to a bogie 10 which is connected in a positionally fixed manner to the rail vehicle 2. By contrast, the wheels 8 can move relative to the bogie 10 because the wheels are connected to the bogie 10 for example by way of a suspension arrangement (not illustrated in any more detail).

In at least one disclosed embodiment, each wheel 8 is assigned a control device 12 which may for example be provided for actuating a brake 14 of the wheel on the basis of a brake target value (not shown any more detail). The brake target value is, in the disclosed embodiment, compared with a brake actual value 16 to regulate the braking action of the brake. The brake actual value is based on the consideration that the braking action of the brake 14 is dependent on a friction coefficient of two braking partners of the brake 14, for example a brake disk and a friction pad, during the braking operation. To allow for the friction coefficient, as an actual value, the based on the braking force imparted by means of the brake 14 the braking force actually transmitted to the brake disk owing to the friction coefficient is determined, the actually transmitted braking force arising, in geometrical terms, from a deformation of the brake 14 in the circumferential direction of the associated wheel 8. The brake actual value 16 is thus dependent on the above-described deformation of the brake 14 in the circumferential direction of the wheel 8, for which reason the brake regulation is performed on the basis of the deformation of the brake 14 as brake actual value 16.

The disclosed embodiment is based on the consideration that vibrations and other mechanical loads could however also have an influence on the deformation of the brake 14 in the circumferential direction of the wheel 8. The vibrations may arise from out-of-roundness of the wheel 8 or even a derailment of the rail vehicle 2.

The vibrations are manifested in the deformation of the brake 14 as undesired noise, and thus as a disturbance variable for the regulation.

The vibrations can however also be identified in the deformation of the brake 14 and thus in the brake actual value 16 because they have a very particular structure. It is therefore proposed, with the disclosed embodiment, that the brake actual value 16 be analyzed by means of the control device 12 for the presence of the very particular structures. If one of the structures is found in the brake actual value 16, it is thus possible to infer a fault corresponding to the particular structure, such as an out-of-roundness of the wheel or a derailment.

FIG. 1 shows the corresponding output of the brake actual value 16 only to one of the control devices 12. The output may however be monitored and analyzed in the manner described above by means of each individual one of the control devices 12.

Figure 2:
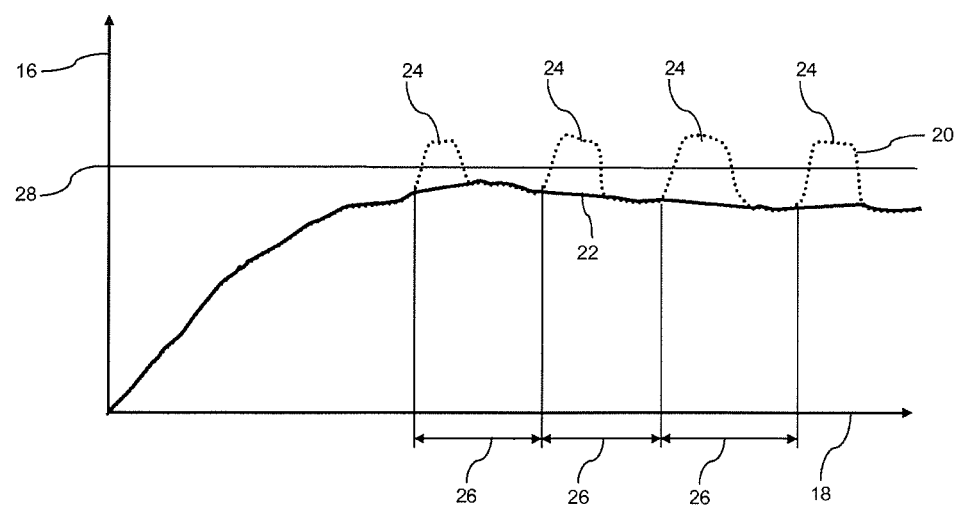
FIG. 2 shows a brake signal to be analyzed.

Reference is made to FIG. 2 in which, in a diagram, the brake actual value 16 is plotted versus the time 18 as a dotted line 20 for a wheel 8 which has an imbalance and as a solid line 22 for a wheel 8 without imbalance.

As can be seen from FIG. 2, the imbalance leads to excursions 24 in the deformation of the brake 14 and thus in the brake actual value 16.

To better identify the excursions 24, it is possible for the detected brake actual value 16 illustrated by means of the dotted line 20 to have filtered out therefrom the expected brake actual value 16, which is illustrated by means of the solid line 22 and which should ultimately arise in a vibration-free state of the rail vehicle 2, if the ideal profile of the brake actual value 16 is known. A distinction can be made between an imbalance of the wheel 8 and a derailment of the rail vehicle 2 on the basis of a time interval 26 between the excursions 24 and a threshold value 28 for the excursions 24.

The filtering of the brake actual value 16 and thus of the deformation of the brake 14 in the circumferential direction of the wheel 8 can, by means of the filtering of an expected profile of the brake actual value 16, be extended to other expected profiles of the brake actual value 16 if the profiles can be assigned to effects at the brake 14 which are not of interest for the detection of imbalances of the wheel 8 and of a derailment of the rail vehicle 2.

The invention claimed is:

1. A method for monitoring a wheel mounted on a bogie of a rail vehicle, the method comprising:
    detecting a deformation of a brake for braking the wheel in a circumferential direction of the wheel via a sensor; and
    performing a plausibility check of the detected deformation with a control device assigned to the wheel based on a comparison with a target position identifying deviations of the detected deformation from the target position.

2. The method of claim 1, further comprising:
    detecting the deformation of the brake during a braking process of the rail vehicle.

3. The method of claim 1, wherein the detected deformation of the brake is dependent on a brake force acting on the wheel.

4. The method of claim 1, further comprising:
    filtering the detected deformation of the brake before the plausibility check of the detected relative position.

5. The method of claim 4, wherein the filtering of the detected deformation of the brake comprises a separation of a deformation caused by the braking force from the detected deformation.

6. The method of claim 1, further comprising:
    detecting a derailment of the rail vehicle if an excursion of the detected deformation exceeds a predetermined value.

7. The method of claim 1, further comprising:
    detecting an imbalance of the wheel if the detected deformation comprises a harmonic whose frequency corresponds to the rotation of the wheel or to a multiple of the rotation of the wheel.

8. The method of claim 7, wherein the imbalance of the wheel comprises an out-of-roundness and/or a flat spot.

9. A control device comprising:
    a processor, and
    a memory having instructions that when executed cause the processor to
    detect a deformation of a brake for braking the wheel in a circumferential direction of the wheel, and
    perform a plausibility check of the detected deformation based on a comparison with a target position.

10. A rail vehicle comprising the control device of claim 9.

* * * * *